United States Patent [19]
Ruediger et al.

[11] Patent Number: 5,961,925
[45] Date of Patent: Oct. 5, 1999

[54] APPARATUS FOR SYNTHESIS OF MULTIPLE ORGANIC COMPOUNDS WITH PINCH VALVE BLOCK

[75] Inventors: Waldemar Ruediger, New Hope, Pa.; Wenjeng Li, Plainsboro, N.J.; John William Allen, Jr., Lawrenceville, N.J.; Harold Norris Weller, III, Pennington, N.J.

[73] Assignee: Bristol-Myers Squibb Company, Princeton, N.J.

[21] Appl. No.: 08/935,037

[22] Filed: Sep. 22, 1997

[51] Int. Cl.$^6$ .............................. B01L 11/00; G05D 7/00
[52] U.S. Cl. ........................... 422/99; 422/100; 422/102; 422/103; 422/110
[58] Field of Search ................................ 422/99, 100, 58, 422/68.1, 116, 110, 119, 102, 103, 104, 108

[56] References Cited

U.S. PATENT DOCUMENTS

| | | | |
|---|---|---|---|
| 4,154,795 | 5/1979 | Thorne | 422/99 |
| 4,304,865 | 12/1981 | O'Brien et al. | 435/240 |
| 4,319,841 | 3/1982 | Suovaniemi et al. | 356/244 |
| 4,483,964 | 11/1984 | Urdea et al. | 525/54.14 |
| 4,517,338 | 5/1985 | Urdea et al. | 525/54.14 |
| 4,659,222 | 4/1987 | Ekholm | 356/244 |
| 4,746,490 | 5/1988 | Saneli | 422/62 |
| 4,797,259 | 1/1989 | Matkovich et al. | 422/101 |
| 4,948,442 | 8/1990 | Manns | 156/73.1 |
| 4,948,564 | 8/1990 | Root et al. | 422/101 |
| 4,970,165 | 11/1990 | Uhrin | 435/287 |
| 5,039,493 | 8/1991 | Oprandy | 422/101 |
| 5,048,957 | 9/1991 | Berthold et al. | 356/246 |
| 5,053,454 | 10/1991 | Judd | 525/54.11 |
| 5,108,704 | 4/1992 | Bowers et al. | 422/70 |
| 5,219,528 | 6/1993 | Clark | 422/101 |
| 5,240,680 | 8/1993 | Zuckermann et al. | 422/67 |
| 5,252,296 | 10/1993 | Zuckermann et al. | 422/116 |
| 5,283,039 | 2/1994 | Aysta | 422/104 |

(List continued on next page.)

FOREIGN PATENT DOCUMENTS

| | | |
|---|---|---|
| WO 96/15450 | 5/1996 | WIPO. |
| WO 96/42004 | 12/1996 | WIPO. |
| WO 97/07126 | 2/1997 | WIPO. |
| WO 97/10896 | 3/1997 | WIPO. |

OTHER PUBLICATIONS

"Computer–assisted automatic synthesis II. Development of a fully automated apparatus for preparing substituted N–(carboxyalkyl)amino acids", Hayashi et al, Journal of Automatic Chemistry, vol. 11, No. 5, Sep.–Oct. 1989, pp. 212–220.

(List continued on next page.)

*Primary Examiner*—Jill Warden
*Assistant Examiner*—Alexander Markoff
*Attorney, Agent, or Firm*—James & Franklin, LLP; Robert L. Epstein, Esq.; Harold James, Esq.

[57] ABSTRACT

The simultaneous synthesis of diverse organic compounds is performed in stackable modules which are moveable among nesting sites located on work station platforms. The reactor module includes a block adapted to receive an array of tube-like reactor vessels. The vessels are sized to optionally accept porus polyethelyene mircocannisters with radio frequency transmitter tags. Each vessel has a bottom port connected to an outlet tube. A valve block located below the reactor vessels simultaneously controls discharge through the outlet tubes. The valve block includes plates with aligned, relatively moveable sets of rib surfaces which act through Teflon encapsulated silicone O-ring cord sections to simultaneously close rows of outlet tubes. By first utilizing reactor vessels in one set of 48 positions, out of the possible 52 reactor vessel positions in the reactor block, and then utilizing reactor vessels in the other set of 48 positions and shifting the relative position of the collection plate, a single reactor can be employed to discharge into all of the wells of a standard 96 well microtiter collection plate. The apparatus can be used to perform the entire synthesis or only the final cleavage step of a radio frequency tagged synthesis.

18 Claims, 13 Drawing Sheets

U.S. PATENT DOCUMENTS

| | | | |
|---|---|---|---|
| 5,288,468 | 2/1994 | Church et al. | 422/116 |
| 5,324,483 | 6/1994 | Cody et al. | 422/131 |
| 5,342,581 | 8/1994 | Sanadi | 422/101 |
| 5,368,823 | 11/1994 | McGraw et al. | 422/134 |
| 5,380,495 | 1/1995 | Chang et al. | 422/131 |
| 5,472,672 | 12/1995 | Brennan | 422/131 |
| 5,503,805 | 4/1996 | Sugarman et al. | 422/131 |
| 5,512,168 | 4/1996 | Fetner et al. | 210/198.2 |
| 5,529,756 | 6/1996 | Brennan | 422/131 |
| 5,541,314 | 7/1996 | McGraw et al. | 536/25.31 |
| 5,559,032 | 9/1996 | Pomeroy et al. | 435/289.1 |
| 5,574,656 | 11/1996 | Agrafiotis et al. | 364/500 |
| 5,585,069 | 12/1996 | Zanzucchi et al. | 422/100 |
| 5,593,838 | 1/1997 | Zanzucchi et al. | 435/6 |
| 5,603,351 | 2/1997 | Cherukuri et al. | 137/597 |
| 5,609,826 | 3/1997 | Cargill et al. | 422/99 |
| 5,614,608 | 3/1997 | Krchnak et al. | 530/334 |

OTHER PUBLICATIONS

"'Diversomers': An approach to nonpeptide, nonoligomeric chemical diversity", DeWitt et al, 1993, pp. 6909–6913.

"The Diversomer Approach: Integration and Automation of Multiple, Simultaneous Organic Synthesis on a Solid Support" DeWitt et al, ISLAR '93 Proceedings, pp. 1–15. 1993.

"Design, construction and application of a fully automated equimolar peptide mixture synthesizer", Zuckerman et al., 1992, pp. 497–506.

"Automated Chemical Synthesis", Main et al, Zeneca Pharmaceuticals, Cheshire, UK, , 10 pages. Date Unknown.

"Radiofrequency Encoded Combinatorial Chemistry", Nicolaou et al, Angew Chem. Int. Ed. Engl. 1995 34 No. 20, pp. 2289–2291.

"Radio Frequency Tag Encoded Combinatorial Library Method for the Discovery of Tripeptide–Substituted Cinnamic Acid Inhibitors of the Protein Tyrosine Phosphatase PTPIB", Moran et al, J. Am. Chem. Soc. 1995 117, pp. 10787–10788.

"Automated Combinatorial Chemistry on Solid Phase", Cargill et al, 1996, pp. 139–148.

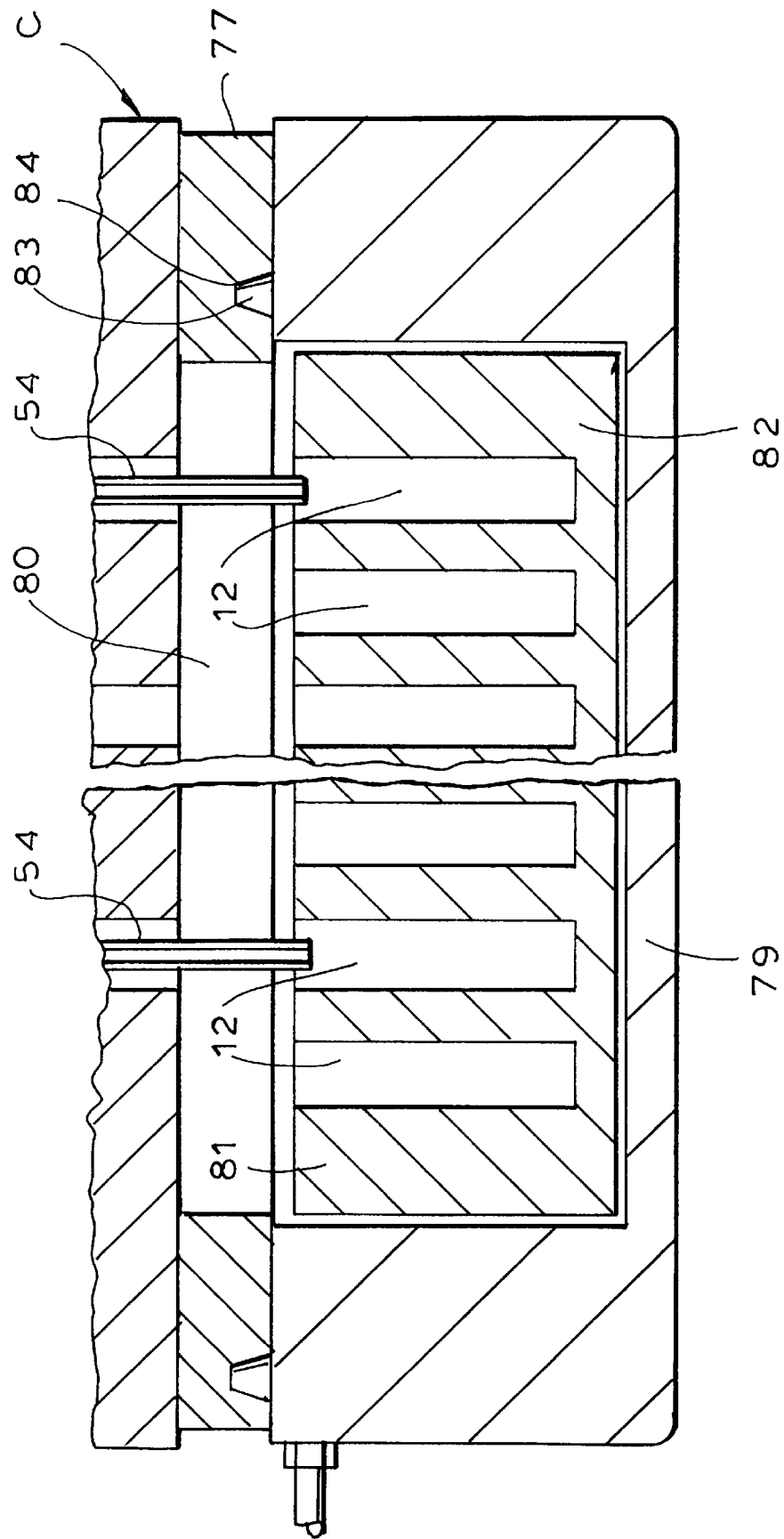

APPARATUS FOR SYNTHESIS OF MULTIPLE ORGANIC COMPOUNDS WITH PINCH VALVE BLOCK

The present invention relates to apparatus for combinatorial drug research to be used in the simultaneous parallel solid and solution phase synthesis of large numbers of diverse organic compounds or for the final cleavage step of radio frequency tagged synthesis and more particularly to a modular apparatus designed for such purposes which employs a unique pinch valve block, which includes reactor vessels capable of receiving porus polyethelyene microcannisters with radio frequency transmitter tags and which can be used to discharge into all of the wells of a standard microtiter plate.

BACKGROUND OF THE INVENTION

1. Field of the Invention

Efficient testing of organic compounds in the modern pharmaceutical laboratory requires the synthesis of large numbers of diverse organic molecules in an automated and high speed manner. The apparatus of the present invention is designed for use in such a system, particularly one which employs solid phase synthesis techniques. It is useful in performing the entire synthesis or for performing only the final cleavage step of radio frequency tagged synthesis.

During the course of the synthesis, various operations must be performed on the samples, including reagent introduction and removal, agitation, washing, and compound removal by cleavage from a resin support. Precise control of temperature, pressure and atmospheric gas mixtures may be required at various stages. These operations are standard and can be performed at task specific work stations which have been designed or modified for use with one or more reactors.

2. Description of the Related Art

Over the last few years, a number of different systems have been developed to produce libraries of large numbers of specific types of organic molecules, such as polynucleotides. However, the usefullness of such systems tends to be limited to the particular type of molecule the system was designed to produce. Our invention is much more general in application. It can be used to synthesize all types of organic compounds including those used in pharmaceutical research, the study of DNA, protein chemistry, immunology, pharmacology or biotechnology.

Aside from the lack of versatility, existing equipment for automated organic synthesis tends to be large and heavy, as well as very expensive to fabricate and operate. Known automated systems also tend to be quite complex, requiring equipment which is limited as to flexibility, speed, and the number and amount of compounds which can as be synthesized. As will become apparent, our system has a simple, elegant design. It is relatively inexpensive to fabricate and operate. However, it is extremely flexible and is capable of producing large numbers and amounts of all types of organic compounds in a high speed, automated manner. It is smaller in size than comparable equipment, permitting more reactors to be used at one time at a work station and it is lighter, thereby facilitating movement of the apparatus between work stations with less effort.

One system of which we are aware was developed for use at Zeneca Pharmaceuticals, Alderley Park, Macclesfield, Cheshire, SK10 4TG, United Kingdom. That system is built around an XP Zymate laboratory robot (Zymark Corporation, Hopkinton, Mass.). The robot arm is situated in the middle of a plurality of stationary work stations arranged in a circle. The arm is programmed to move one or more tube racks from one station to another. However, the Zeneca system has a small throughput capability, as the number of tube racks which can be handled at one time is limited.

An automated peptide synthesizer developed for Chiron Corporation of Emeryville, Calif.., which has similar limitations, is described by Ronald N. Zukermann, Janice M. Kerr, Michael A. Siani and Steven C. Banville in an article which appeared in the International Journal of Peptide and Protein Research, Vol. 40, 1992, pages 497–506 entitled "Design, Construction and Application of a Fully Automated Equimolar Peptide Mixture Synthesizer". See also U.S. Pat. No. 5,240,680 issued Aug. 31, 1993 to Zuckermann and Banville and U.S. Pat. No. 5,252,296 issued Oct. 12, 1993 to Zukermann et al. entitled "Method and Apparatus For Biopolymer Synthesis".

Another approach was developed at Takeda Chemical Industries, Ltd. and is described in an article published in the Journal of Automatic Chemistry, Vol. 11, No. 5 (Sept.-Oct. 1989) pp. 212–220 by Nobuyoshi Hayashi, Tobru Sugawara, Motoaki Shintani and Shinji Kato entitled "Computer-assisted Automatic Synthesis II. Development of a Fully Automated Apparatus for Preparing Substituted N-(carboxyalkyl) Aminio Acids". The Takeda system includes a plurality of stationary units which are computer controlled. The reactor unit includes only two reaction flasks. A plurality of computer controlled solenoid valves regulate the input flow from the reactant supply unit and wash solvent supply unit as well as output to the purification unit, exhaust and drainage unit. Sensors and electrodes feed information back to the computer. That system is complex, costly and inflexible. It is also very limited with respect to the number of compounds which can be synthesized.

A more flexible approach has been suggested by the Parke-Davis Pharmaceutical Research Division of Warner-Lambert, as described by Sheila Hobbs DeWitt et al. in Proc. National Academy of Science, USA, Vol. 90, pp. 6909–6913 August 1993 and in the ISLAR '93 Proceedings. That system employs a Tecan robotic sample processor. A manifold of gas dispersion tubes are employed in combination with glass vials. The glass frits of the tubes contain the solid support during reactions. However, like many prior art systems, in this apparatus, samples from the reaction tubes must be removed from above, using a modified needle as a probe. There is no facility for removal from the bottoms of the tubes. Accordingly, obtaining product from the reactor vessels in the Parke-Davis system is awkward and time consuming.

U.S. Pat. No. 5,472,672 issued Dec. 5, 1995 to Thomas Brennan, entitled "Apparatus and Method for Polymer Synthesis Using Arrays", teaches the use of an automated system in which a transport mechanism is used to move a base having an array of reactor wells in conveyor belt fashion from work station to work station. Sample removal is performed by creating a pressure differential between the ends of the wells. Aside from the difficulties with regard to discharge, this system is complex and lacks flexibility.

We are also aware of system designed by the Ontogen Corporation of Carlsbad, Calif. 92009 as disclosed by John Cargill and Romaine Maiefski in Laboratory Robotics and Automation, Vol. 6 pp. 139–147 in an article entitled "Automated Combinatorial Chemistry on Solid Phase" and disclosed in U.S. Pat. No. 5,609,826 entitled "Methods and Apparatus for the Generation of Chemical Libraries" issued Mar. 11, 1997 to John Cargill and Romaine Maiefski. The system disclosed in the article and patent utilizes a reactor block having an array of reactor vessels. The block is moved along an assembly line of work stations under computer control.

The Ontogen apparatus disclosed in the above mentioned article and patent has a number of shortcomings. It is highly complex and expensive. It does not include any valving structure capable of regulating the fluid discharge from the reactor chambers. Instead, it depends upon pressure differential to cause discharge through s-shaped trap tubes which snap into a fitting on the bottom of each reaction vessel. This takes up a lot of room, preventing the dense packing of the reactor vessels. It also makes product removal awkward.

Because the reactor vessels disclosed in the article and patent cannot be densely packed, mirror image reactors are required in the Ontogen system to discharge into all of the densely packed wells of a standard microtiter plate. As described in U.S. Pat. No. 5,609,826, two different reactor configurations, each capable of receiving a set of 48 reaction vessels, are required to deposit directly into all 96 of the microtiter wells.

Reactor vessels of the type commonly used in the art are not adapted to receive commercially available porus polyethelene microcannisters. As is disclosed in the literature noted below, such microcannisters can be radio frequency transmitter tagged for automated tracking. Hence, it would be very advantageous to have a reactor which could deposit into all the microtiter wells and still utilize reactor vessels capable of receiving commercially available microcannisters.

International Publication Number WO 97/10896 under the Patent Cooperation Treaty published on Mar. 27, 1997 teaches apparatus for simultaneous solid phase chemical synthesis developed by Berlex Laboratories, Inc. of Richmond, Calif. The Berlex equipment utilizes a manifold valve block including a plurality of aligned valve inserts which are controlled by valve stems. The stems are rotated by hydraulic cylinders positioned on either side of the manifold. The Berlex apparatus accomodates 96 reactor vessels at one time in a densely packed array. However, the reactor vessels cannot receive porous microcannisters with radio frequency tags. Moreover, this reactor requires a specially designed solvent delivery system.

Personnel at Bristol-Myers Squibb Company of Princeton, N.J. 08543 developed an earlier version of the present apparatus designed for use in the simultaneous synthesis of diverse organic compounds. Like the present invention, it consisted of stackable modules which are moveable among nesting sites located on work station platforms. The reactor module in that version includes a heat transfer block adapted to receive an array of reactor vessels. The reactor vessels are in the form of solid phase extraction cartridges without sorbent. Each has a bottom outlet port. A plurality of separate valves arranged in rows are located below the vessels. The valves consist of stopcocks which are gang-controlled to regulate the discharge from the reactor vessel outlet ports into aligned channels, each formed by a pair of threated Leur tip adapters. The reactor module is situated over a discharge module. The inlet openings in the discharge module are adapted to accept the threaded ends of the Leur tip adapters. The discharge module consists of a multi-well collector block or a drain block. A solvent introduction module, which includes a pressure plate having an array of openings and a septum, is received over the reactor module. The downwardly projecting rim defining each pressure plate opening cooperates with the septum to engaged the mouth of the aligned reactor vessel to maintain a fluid tight seal.

Although that apparatus was a vast improvement over the prior art systems, it still had some disadvantages. For example, the apparatus was still relatively large and has connectors and levers extending outwardly from the sides, allowing only two reactors to fit under a standard fume hood at one time. Each reactor weighed about 18 pounds and was costly to fabricate. Thus, improvement in the areas of size, weight and cost are possible. A more elegant valve system, with fewer moving parts, is also desireable. Provision for receiving commercially available porous microcannisters with radio frequency transmitter tags for automated encoding in the reactor vessels would be extremely advantagous. Moreover, a structure which could accommodate standard microtiter plates or blocks for specimen collection would be an important advance. Improvements in these areas are embodied in the present invention.

Our approach to the automation problem in this invention is to employ modules of simplified design and construction which can be readily arranged in sets to perform the required operations and which are light in weight so as to be easily moveable among nest sites at standard work stations. This permits the greatest amount of flexibility at the least cost. Due to more compact design, more reactors can be assembled and employed at one time by creating multiple nest sites at a single work station, such as an orbital shaker. For time consuming operations, several work stations can be in use simultaneously, to permit parallel flow of reactors and therefore eliminate bottlenecks. For less time consuming operations, fewer work stations can be used, as long as the flow of reactors is not impeded. Because the reactors are lighter in weight, they are easier to transport. Accordingly, maximum throughput is acheived with minimum investment.

In addition, the apparatus of the present invention is designed to permit sample removal from the bottom of the reactor vessels as in the earlier version of the Bristol-Myers Squibb equipment. However, unlike the earlier equipment system, the present invention employes simplified valving in the form of a unique pinch valve block located beneath the reactor block. The valve block includes plates with sets of aligned, relatively moveable ribs. Each rib set is aligned with the outlet tubes associated with a different row of reactor vessels. Movement of the rib surfaces causes force to be applied to the outlet tubes through Telfon encapsulated silicone O-ring cord sections situated between one rib surface and the adjacent outlet tubes, such that the tubes are simultaneously closed (pinched) without crushing or damaging the tube walls. As a result, the tube walls will reliably resume their original open condition each time the force is released.

The apparatus of the present invention includes a reactor block, located above the valve block, which accepts an array of reactor vessels. The vessels may be any plastic or glass tube with a bottom port, such as a standard solid phase extraction cartidge without sorbent. However, the reactor vessels are preferrably designed to receive porus polyethelene microcannisters provided with radio frequency transmitter tags for automated tracking. The apparatus can be used for the entire synthesis or only the final cleavage step in radio frequency tagged synthesis, as desired.

The reactor module is adapted to mount over a discharge module. The discharge module may consist of a collection block with an array of wells for collection tubes or vessels. Preferably, it takes the form of a 96 well microtiter block of standard size and dimension. If the reactor vessels are large enough to accept commercially available porus microcannisters, they may be too large to permit them to be packed tightly enough to discharge into all of the 96 wells of a standard microtiter block at once. A funnelling device could be interposed between the valve block and the microtiter plate to direct the discharge from the reactor vessels into the wells of the plate. However, such a device is bulky and expensive to fabricate. Alternatively, as in the Ontogen system mentioned above and disclosed in U.S. Pat. No. 5,609,826, mirror image reactors (referred to as type "A" and type "B") could employed, each capable of holding 48 reactor vessels and discharging into a different set of 48 wells in the 96 well microtiter plate.

Our system overcomes the costs and problems of requiring an interposed funnelling device or having two reactor configurations by employing a single reactor block with 52 possible reactor vessel positions, instead of the conventional 48. Either one of two different sets (referred to as "odd" or "even") of 48 positions out of the possible 52 positions can be selected for use. By shifting the position of the reactor block relative to the microtiter plate, discharge into either the odd or even well set in the microtiter plate can be achieved.

Internal vertical supports are employed to facilitate alignment of the blocks as the reactor module sets are formed. The supports each have a plurality of different levels. Different blocks are designed to rest on different levels. In this way, different reactor configurations are easily formed. For example, reactors with or without temperature control blocks can be assembled. Simple nesting brackets with chamfered surfaces make installation of the reactors on the work stations a quick and easy task.

Since the modifications to standard work stations to accept the reactors of the present invention are simple and inexpensive to make, little time or cost is involved in converting a conventional laboratory for use with the system of present invention. This dramatically increases the speed of the set up of a facility to perform the synthesis process, as customized work stations, specialized computers and complex interfaces are not required.

It is, therefore, a prime object of the present invention to provide apparatus for the synthesis of multiple organic compounds which is mechanically simple, small in size, light in weight, relatively inexpensive to construct, does not require extensive set up time, is extremely flexible and has high throughput.

It is another object of the present invention to provide apparatus for the synthesis of multiple organic compounds which consists of a plurality of stackable modules adapted to be moved as a unit among nest sites on work station platforms.

It is another object of the present invention to provide apparatus for the synthesis of multiple organic compounds which can be used for performing the entire synthesis or only the final cleavage step of radio frequency tagged synthesis.

It is another object of the present invention to provide apparatus for the synthesis of multiple organic compounds which includes a multiple valve block in which sets of aligned ribs of relatively moveable plates act through Teflon encapsulated silicone O-ring cord sections to close rows of outlet tubes to regulate the discharge from the reactor vessel ports.

It is another object of the present invention to provide apparatus for the synthesis of multiple organic compounds which is compatable for use with a standard 96 well microtiter collection plate where a single configuration reactor block with 52 reactor vessel positions can be employed to discharge into either the even or the "odd" 48 well sets of the plate by shifting the relative position of the microtiter plate.

It is another object of the present invention to provide apparatus for the synthesis of multiple organic compounds which utilizes reactor vessels adapted to receive porus microcannisters with radio frequency transmitter tags.

In accordance with one aspect of the present invention, apparatus useful for the synthesis of multiple organic compounds is provided. The apparatus is adapted to receive an array of individual reactor vessels. Each vessel has a port connected to an outlet tube. Valve means simultaneously regulate the discharge from the vessels through the outlet tubes. The valve means includes first and second relatively moveable surfaces between which the outlet tubes extend. Resilient means are interposed between one of the surfaces and the outlet tubes. Relative movement of the surfaces causes force to be applied through the resilient means to close the outlet tubes.

BRIEF SUMMARY OF THE INVENTION

The valve surfaces are the surfaces of ribs located on relatively moveable plates. The resilient means preferrably takes the form of Teflon encapsulated silicone O-ring cord, cut in sections and situated adjacent one of the rib surfaces. The rib surface adjacent the cord is shaped to correspond to the shape of the cord. More specifically, it has an arcuate shape which serves to maintain the cord section in proper position. The ends of one of the plates have openings through which the resilient means can be inserted so as to be received between the ribs.

The valve means is located below the reactor vessels. Below the valve means is situated the collection block. The collection block has an array of wells. A plurality of collection vessels are adapted to be received in the wells.

The collection block is capable of receiving 2X number of collection vessels. The apparatus is adapted to receive X number of reactor vessels in Y number of possible positions, where Y is a number larger than X. The collection block can be received in one of two positions relative to the reactor block.

The reactor vessels may receive porus polyethylene microcannisters with radio frequency transmitter tags. Multi-level component internal support and alignment means are provided.

In accordance with another object of the present invention, valve means are provided for the simultaneous regulation of the discharge through outlet tubes connected to the ports of reactor vessels received in an apparatus for the synthesis of multiple organic compounds. The valve means includes first and second aligned, relatively moveable surfaces between which the outlet tubes extend. Resilient means are interposed between one of the surfaces and the outlet tubes. Relative movement of the surfaces causes force to be applied through the resilient means to close the outlet tubes.

The surfaces form portions of plates, and more particularly ribs on plates. The resilient means preferrably comprise Teflon encapsulated silicone O-ring cord sections. One of the rib surfaces is shaped to correspond to the arcuate shape of the outer surface of the cord.

In accordance with another aspect of the present invention, apparatus useful for the synthesis of multiple organic compounds is provided. The apparatus includes means adapted to receive an array of X number of individual reactor vessels, in at least Y number of different positions, where Y is a number greater than X. Each of the vessels has a port connected to an outlet tube. Collection means are provided with an array of 2X number of collection vessels. Means are provided for shifting the position of the collection means relative to the vessel receiving means. By first selecting one and then the other set of X number of reactor vessels of the possible Y number of positions for use, and shifting the position of the collection means between uses, each of the 2X number of collection vessels can receive discharge from the outlet tubes.

The collection means preferrably comprises a standard 96 well microtiter plate. The number X equals 48. The number Y equals 52. Each of the vessels is adapted to optionally receive a porus polyethlyene microcannister with a radio frequency transmitter tag.

Valve means are interposed between the reactor vessels and the collection means for simultaneously regulating the discharge through the outlet tubes.

In accordance with another aspect of the present invention, apparatus useful to the synthesis of multiple organic compounds is provided. The apparatus includes means for receiving an array of tube-like reactor vessels, a plurality of reactor vessels and optionally a porous polyethelyene microcannister with a radio frequency transmitter tag for each vessel. Each of the vessels is adapted to receive a porus polyethelyene microcannister with a radio frequency transmitter tag.

The vessel receiving means is capable of receiving X number of reactor vessels in Y number of wells, where Y is a number is greater than X. The apparatus also includes collection means having 2X number of collection wells. Each of the reactor vessels has a port connected to an outlet tube. Valve means are provided for simultaneously regulating the discharge of fluids through the outlet tubes into the collection wells.

The valve means includes first and second aligned, relatively moveable surfaces between which the outlet tubes extend. Resilient means are interposed between one of the surfaces and the outlet tubes. Relative movement of the surfaces causes force to be applied through the resilient means to close the outlet tubes.

Preferrably, one of the surfaces has an arcuate shape corresponding to the shape of the exterior of the resilient means. This maintains the resilient means in proper position.

In accordance with another aspect of the present invention, aparatus useful for the synthesis of multiple organic compounds is provided, including a plurality of functional components stackable in different configurations to form the apparatus. Multi-level means cooperate with the components to align them. The alignment means is adapted to be mounted on one of the components. It has a first level adapted to support a second component and a second level adapted to support a third component. The levels are defined by different sections of the alignment means.

The components include a valve block. The alignment means is mounted on the valve block.

The second component may include a temperature control block. A pressure plate is used in conjunction with the temperature control block.

The third component may including an alignment plate. The pressure plate is situated above the alignment plate.

The alignment means also includes a bullet nose shaped section on the top level. This section facilitates assembly of the blocks.

The alignment means comprises a standoff. Preferrably, the alignment means includes four standoffs.

BRIEF DESCRIPTION OF THE SEVERAL VIEWS OF THE DRAWINGS

To these and other objects as may hereinafter appear, the present invention relates to apparatus for the synthesis of multiple organic compounds with a pinch valve block, as set forth in detail in the following specification and recited in the annexed claims, taken together with the accompanying drawings, wherein like numerals refer to like parts and in which:

FIG. 14 is a view similar to FIG. 13, showing the collection plate and vacuum adapter in the second relative position.

DETAILED DESCRIPTION OF THE INVENTION

Figure 1:
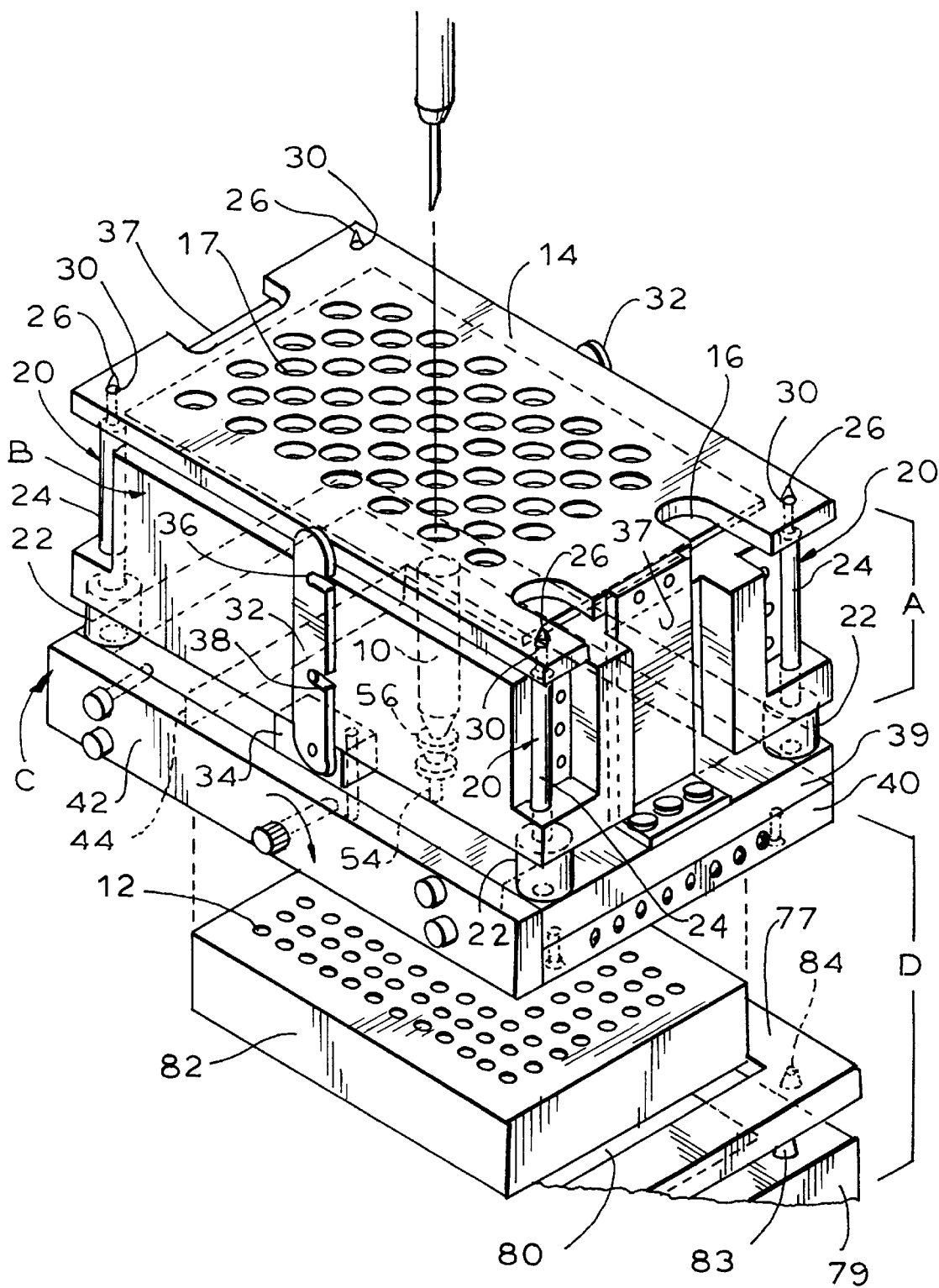
FIG. 1 is an isometric view of a first configuration of the appartus of the present invention including a temperature control block and showing the collection block in exploded position.

The apparatus of the present invention relates to a modular system for the synthesis of diverse organic compounds in which components in the form of blocks and/or plates are stacked to form reactors which can be moved among work stations to perform various steps in the synthesis. A typical reactor consists of a reactor block, generally designated A, which is adapted to retain a plurality of tube-like reactor vessels 10. Block A may include an optional temperature control block, generally designated B, as shown in FIG. 1. Reactor Block A is situated above a valve block, generally designated C, which controls the discharge from reactor vessels 10 into the collection vessels situated in the wells 12 of a microtiter plate which forms a portion of a collection block, generally designated D.

Figure 2:
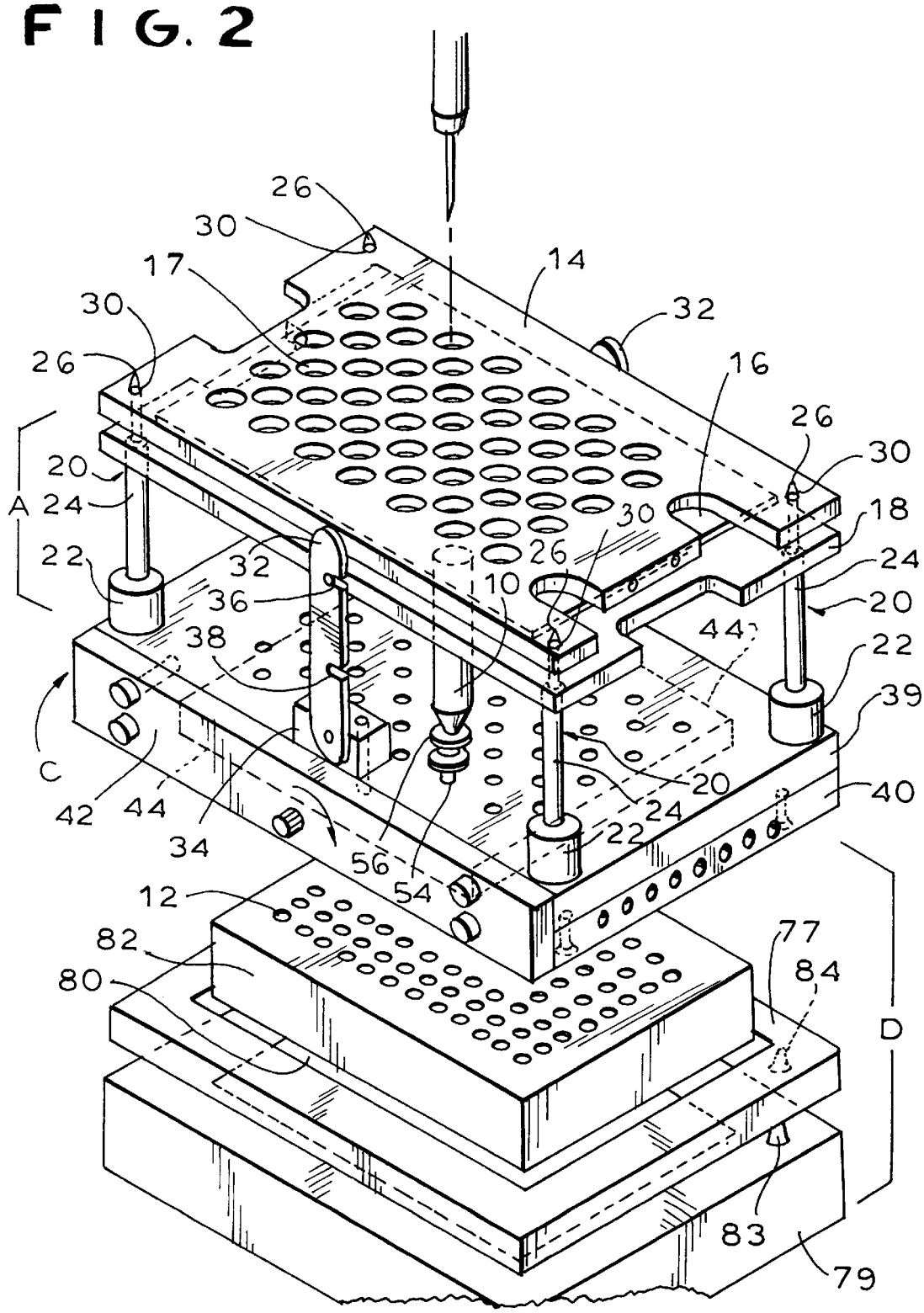
FIG. 2 is an isometric view of a second configuration of the apparatus of the present invention without the temperature control block and with the collection block in exploded position.

Reactor block A includes a pressure plate 14 with a septum 16 situated adjacent its undersurface. Pressure plate 14 has an array of relatively small openings 17, one for each vessel 10. Openings 17 permit the needle of a syringe to be inserted into the aligned reactor vessel, through the septum, to introduce liquids into the vessel. When the temperature control block B is absent, as shown in FIG. 2, an alignment plate 18 is situated below septum 16. Alignment plate 18 has an array of openings 19 each of which receives a reactor vessel 10 so as to retain the vessels in the correct position relative to the pressure plate. Pressure plate 14 is spaced from valve block C so as to permit a plurality of reactor vessels 10 to the situated therebetween.

Four multi-level alignment standoffs 20 are provided to retain the components in proper alignment. Standoffs 20 are mounted on valve block C, at each corner of the apparatus. Each standoff 20 has a lower, larger diameter section 22, an intermediate, mid-sized diameter section 24 and a top, bullet shaped section 26. Temperature control block B, when used (FIG. 1), rests on lower section 22.

Figure 3:
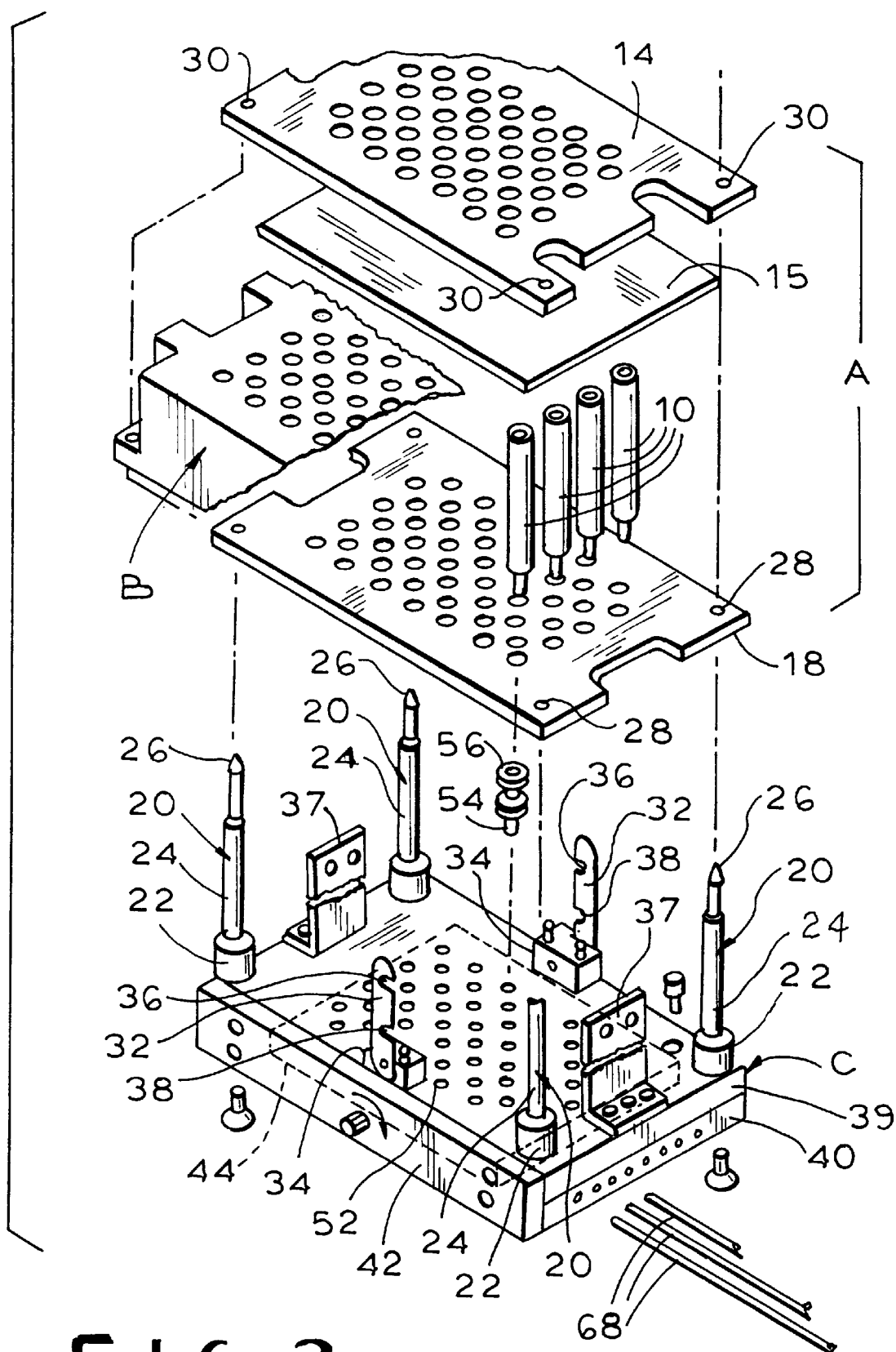
FIG. 3 is an exploded isometric view of the reactor block and valve block of the apparatus of the present invention.

When block B is not used (FIG. 2), alignment plate 18 rests on the intermediate sections 24 of the standoffs. Alignment plate 18 is provided with four holes 28 (FIG. 3). Holes 28 receive the top portions 26 of standoffs 20. Thus, plate 18 is spaced from the top surface of the valve block C by the combined height of sections 22 and 24.

Figure 10:
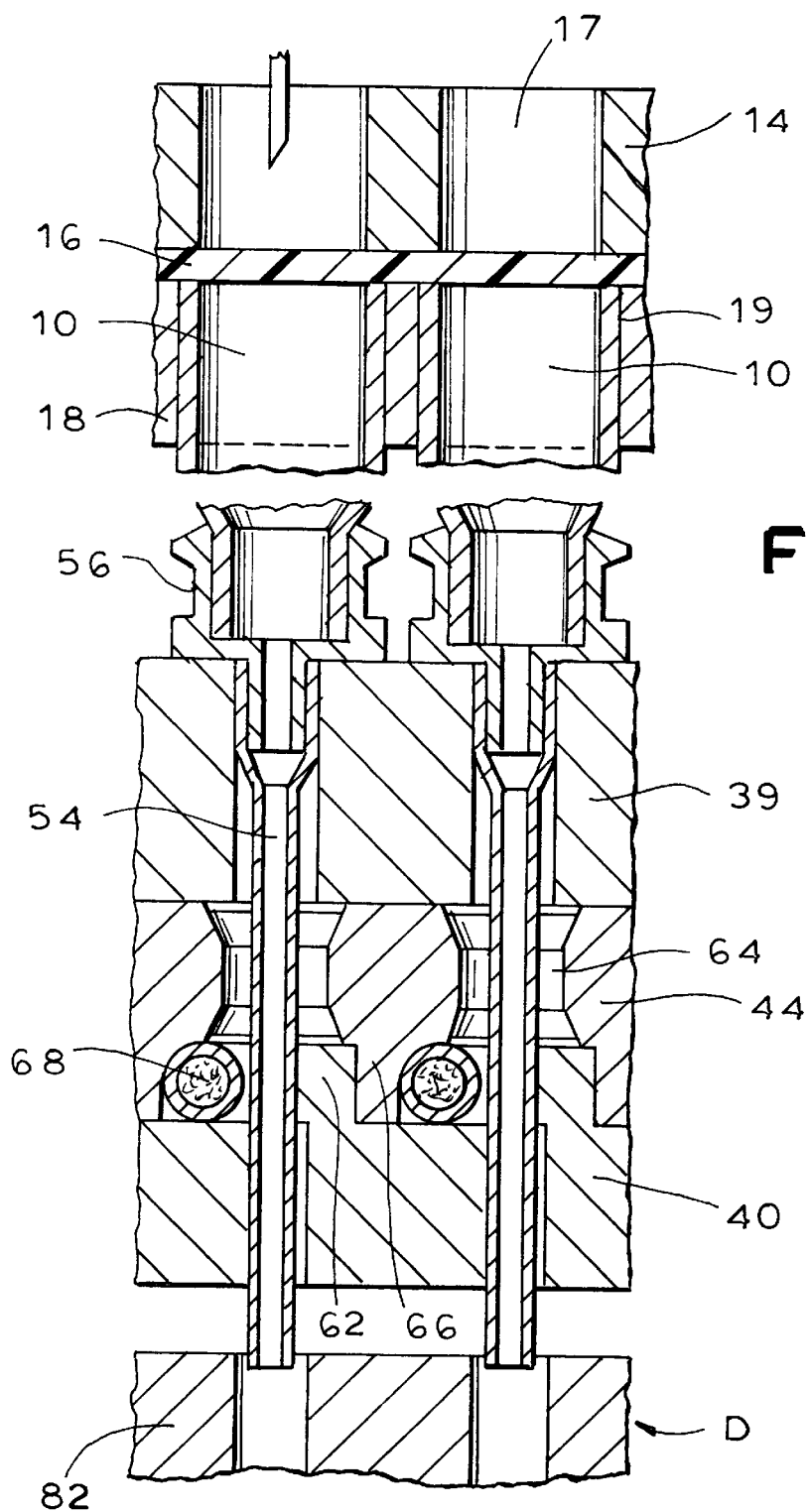
FIG. 10 is a view similar to FIG. 6 showing an enlarged side cross-sectional view of the valve block showing the reactor block without the temperature control block.

Pressure plate 14 also has four holes 30, somewhat smaller than holes 28, which receive bullet shaped sections 26 of standoffs 20. The pressure plate sits over the septum and hence is spaced above the top surfaces of sections 24 of the standoffs. It rests on the rims of the reactor vessels 10, with the septum 16 situated there between (FIG. 10). Clamp brackets 37, located at either end of the unit, retain pressure plate 14. The bullet shape of sections 26 of standoffs 20 facilitate positioning of the plates.

A pair of side latches 32 are mounted on latch pivot blocks 34 located on each side of the top surface of valve block C. Each latch has first and second slots 36, 38 adapted to engage screws extending from temperature control block B or alignment plate 18. As shown in FIG. 1, when temperature control block B is present, slots 38 on each latch 32 receive the screws extending from the sides of the temperature control block to latch temperature control block B in position, when the latches are pivoted to the upstanding position. When no temperature control block B is present, as in FIG. 2, screws from the alignment plate 18 are received in slots 36.

If control of the temperature of the reactor vessels is required, block B is interposed between pressure plate 14 and the valve block C as shown in FIG. 1. Alignment plate 18 is not used in this configuration. The temperature control block is of conventional design, with an array of vertical reactor vessel receiving wells and internal conduits through which water or other fluid can be pumped to regulate the temperature of the reactor vessels.

Figure 4:
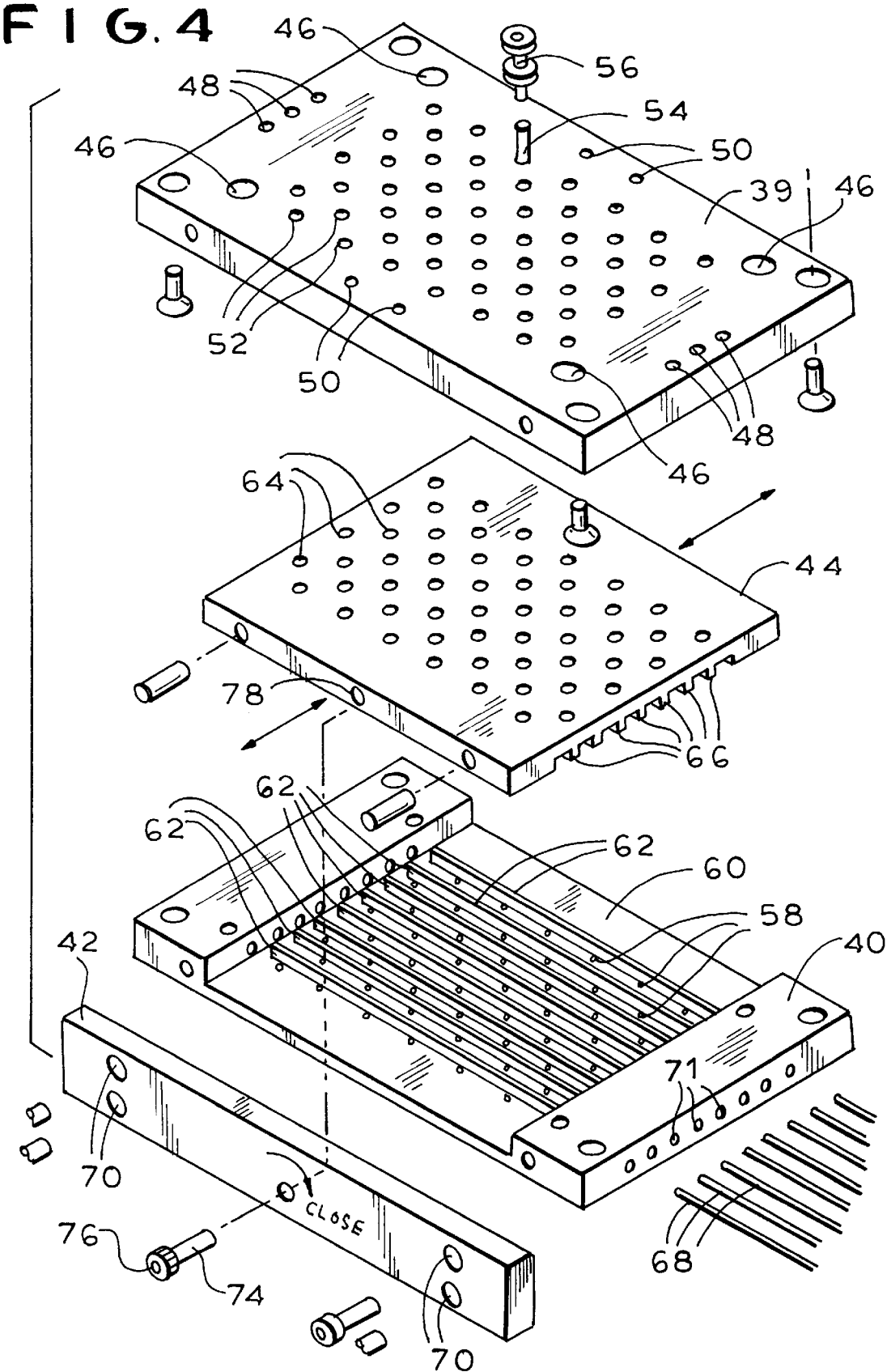
FIG. 4 is an exploded isometric view of the components of the valve block.
Figure 9:
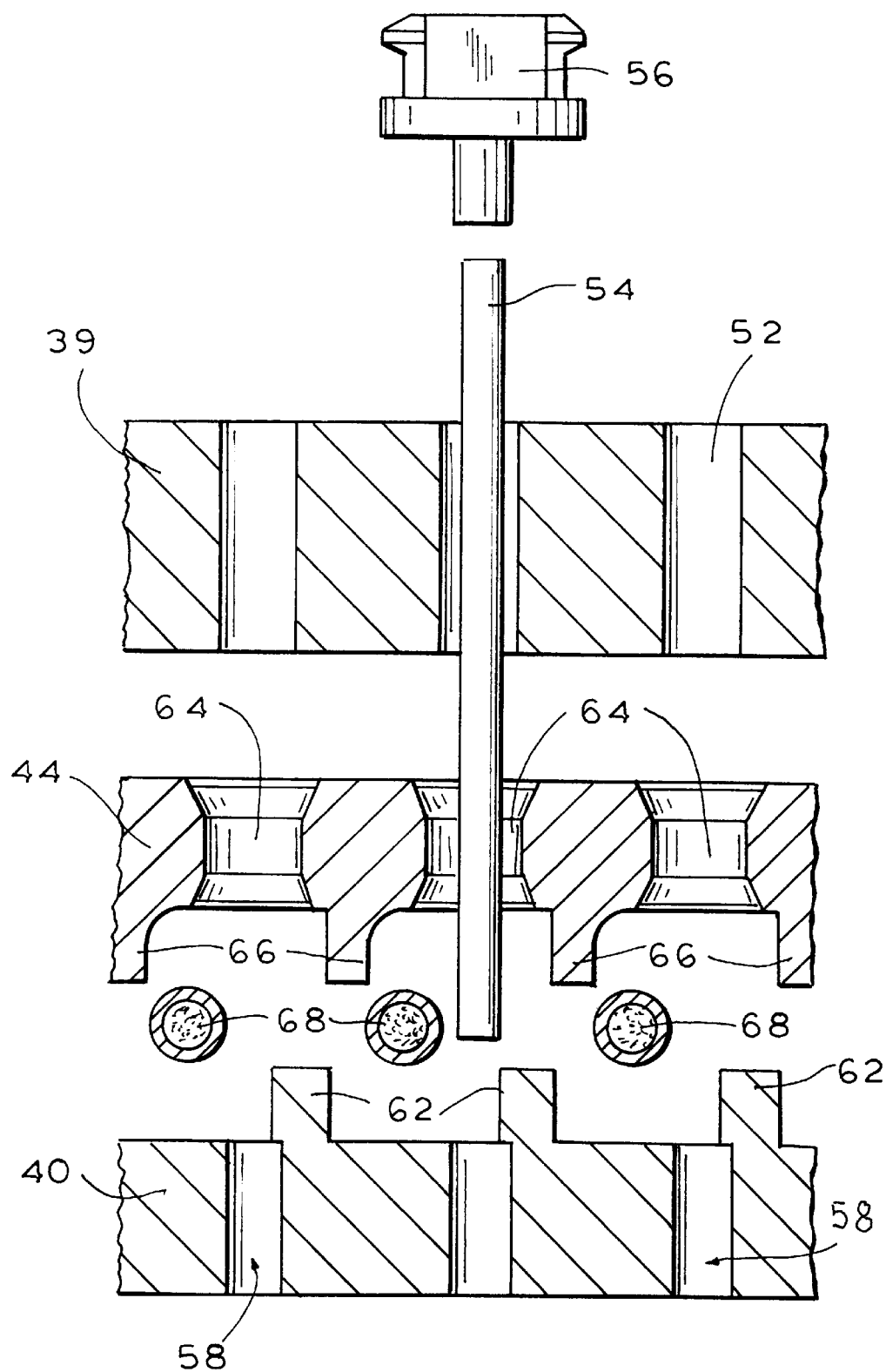
FIG. 9 is an enlarged exploded side cross-sectional view of a portion of the plates and slide of the valve block.

Valve block C is illustrated in exploded form in FIGS. 4 and 9. This block consists of a top plate 39, a bottom plate 40 and an end cap 42 which, when assembled, define a rectangular cavity into which a slide 44 is moveably received.

Top plate 39 is provided with openings 46 for screws to secure it to bottom plate 40. It also has openings 48 for screws to secure brackets 37 and openings 50 for screws to secure latch pivot blocks 34.

Further, plate 39 has an array of small holes 52 adapted to receive the outlet tubes 54 which are attached by Leur tip adapters 56 to the bottom outlet ports of the reactor vessels 10. Outlet tubes of this type are commercially available from Supelco, Inc., Supelco Park, Belleforte, Pa. 10823 as part No. 5-7059 disposable flow control valve liners. One hole 52 in plate 39 is provided for each reactor vessel position in reactor block A.

Bottom plate 40 has corresponding holes 58 for receiving the tubes 54. Holes 58 are of the same number and in the same locations as holes 52 in plate 39. As best seen in FIG. 4, plate 40 has a "U" shaped configuration, when viewed from the end. The upper surface of the middle recessed portion 60 of the plate has eight spaced upstanding ribs 62. Each rib 62 is situated adjacent a different row of holes 58 and, as best seen in FIG. 9, actually extends a small way over the rim of the hole.

Slide 44 also has an array of holes 64 of the same number and location as holes 52 and holes 58. However, as best seen in FIG. 9, the top and bottom of each hole 64 is flared outwardly such that conic sections are formed adjacent the top and bottom surfaces of slide 44 so as not to cut or permanently distort tubes 54.

The bottom surface of slide 44 is recessed and provided with eight downwardly extending ribs 66. Each rib 66 is aligned with a different rib 62 on bottom plate 40. Between each set of aligned ribs 66, 62 is situated a row of outlet tubes 54. Movement of slide 44 relative to bottom plate 40 causes ribs 66 to move towards ribs 62 such that the outlet tubes are pinched closed, compare FIGS. 5, 7 and 8.

Figure 5:
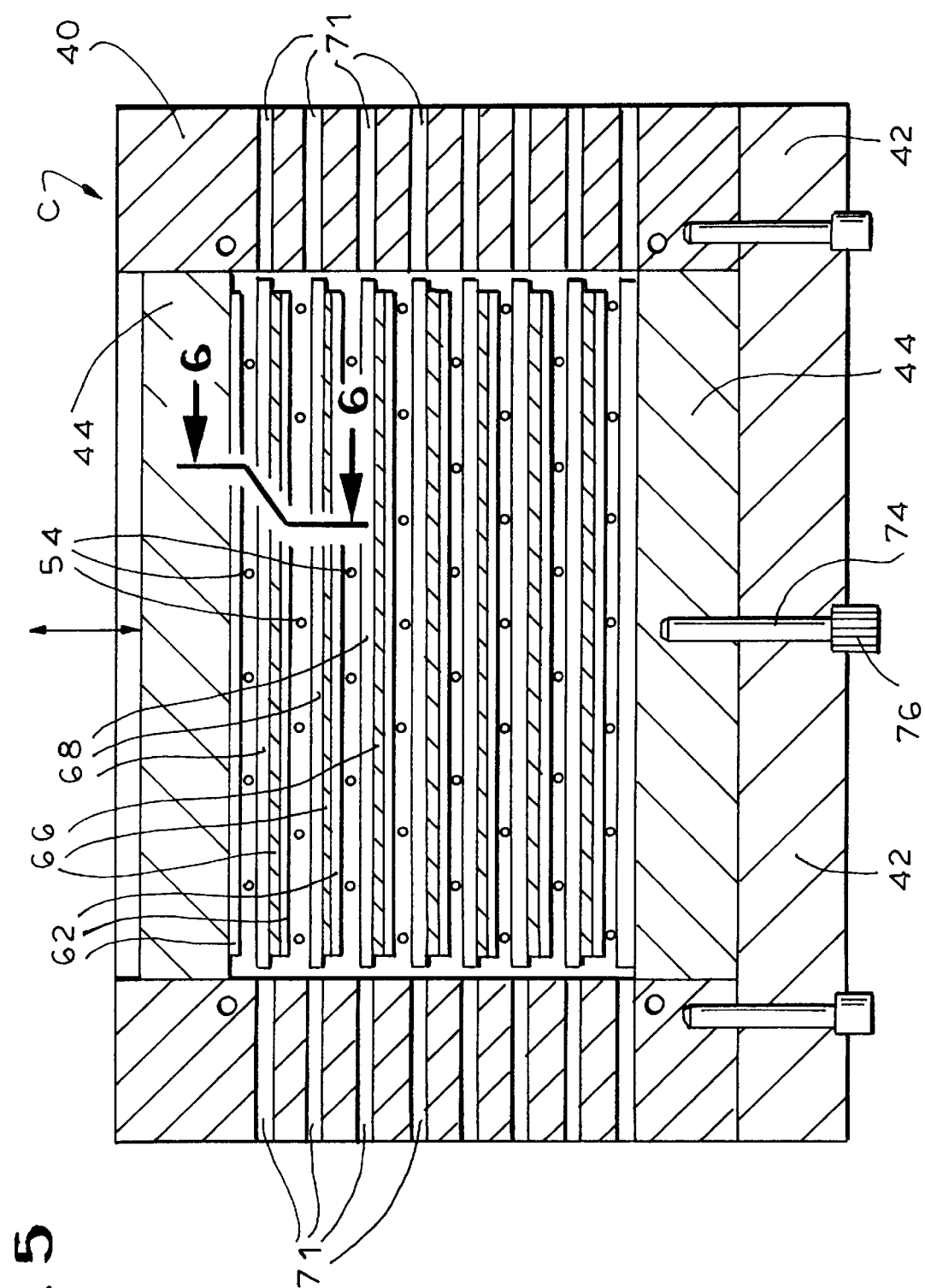
FIG. 5 is a top cross-sectional view of the valve block, shown in the open state.
Figure 6:
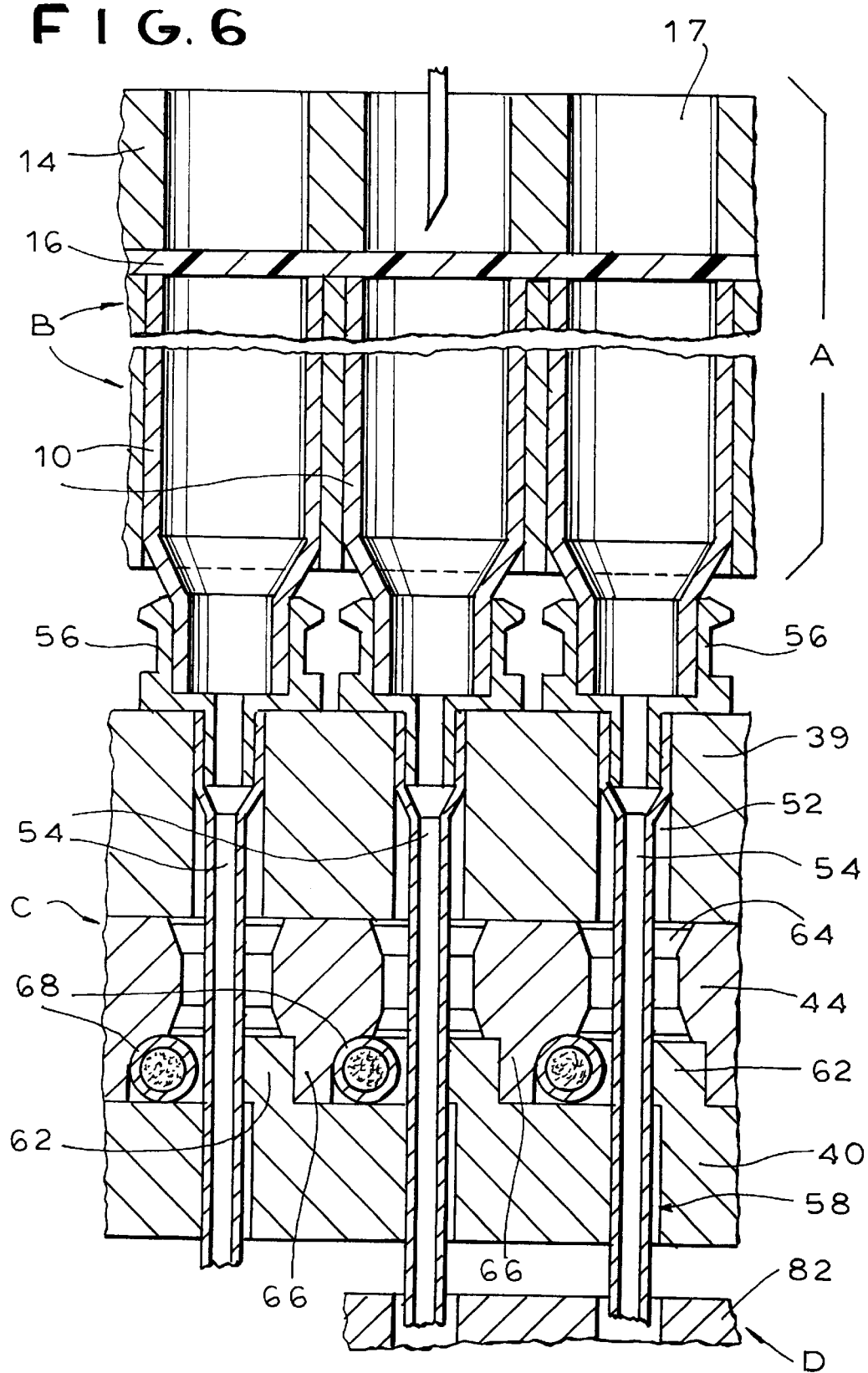
FIG. 6 is an enlarged side cross-sectional view of the valve block taken along line 6—6 of FIG. 5 showing the reactor block with the temperature control block.
Figure 7:
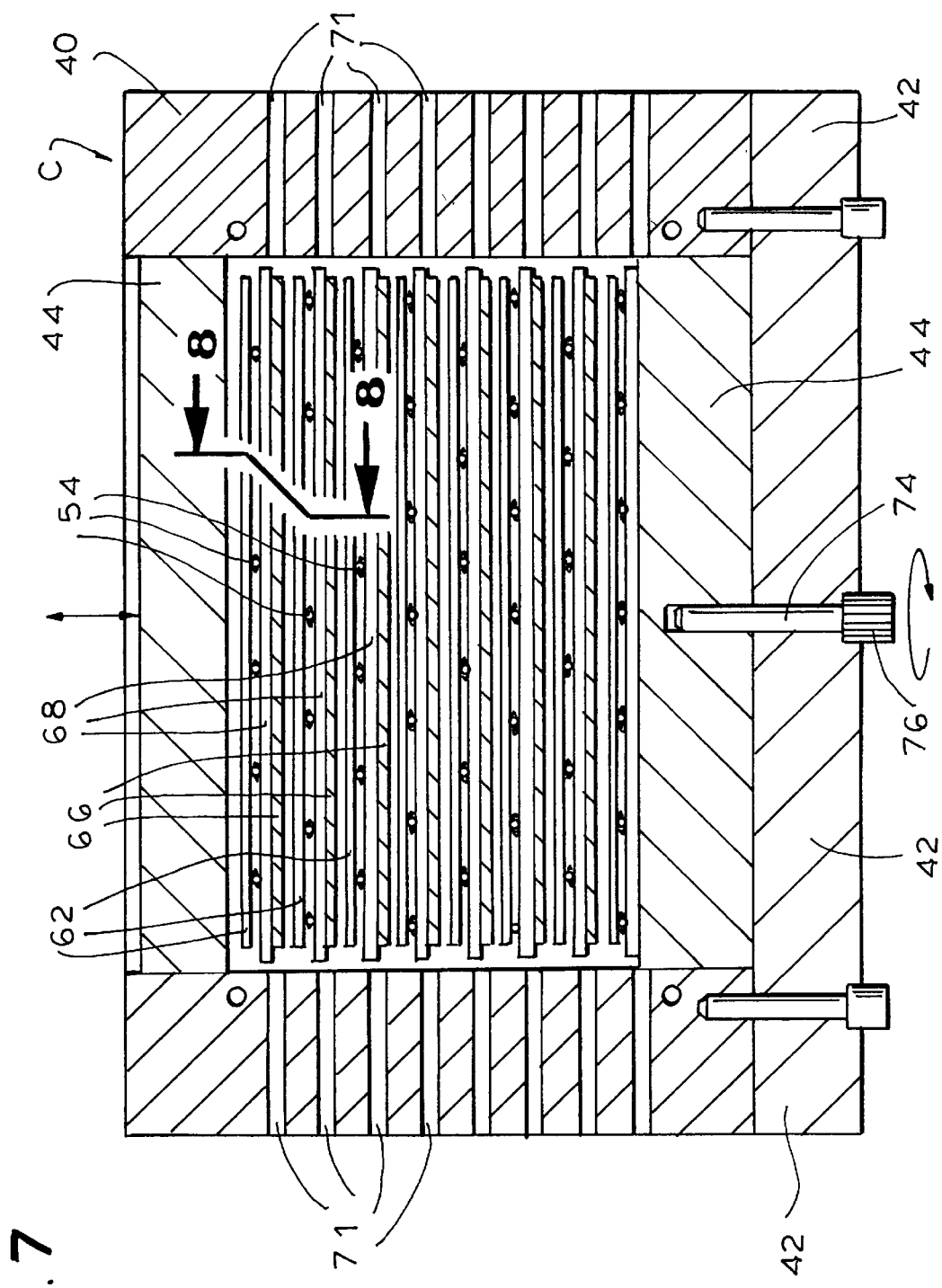
FIG. 7 is a top cross-sectional view of the valve block, shown in the closed state.
Figure 8:
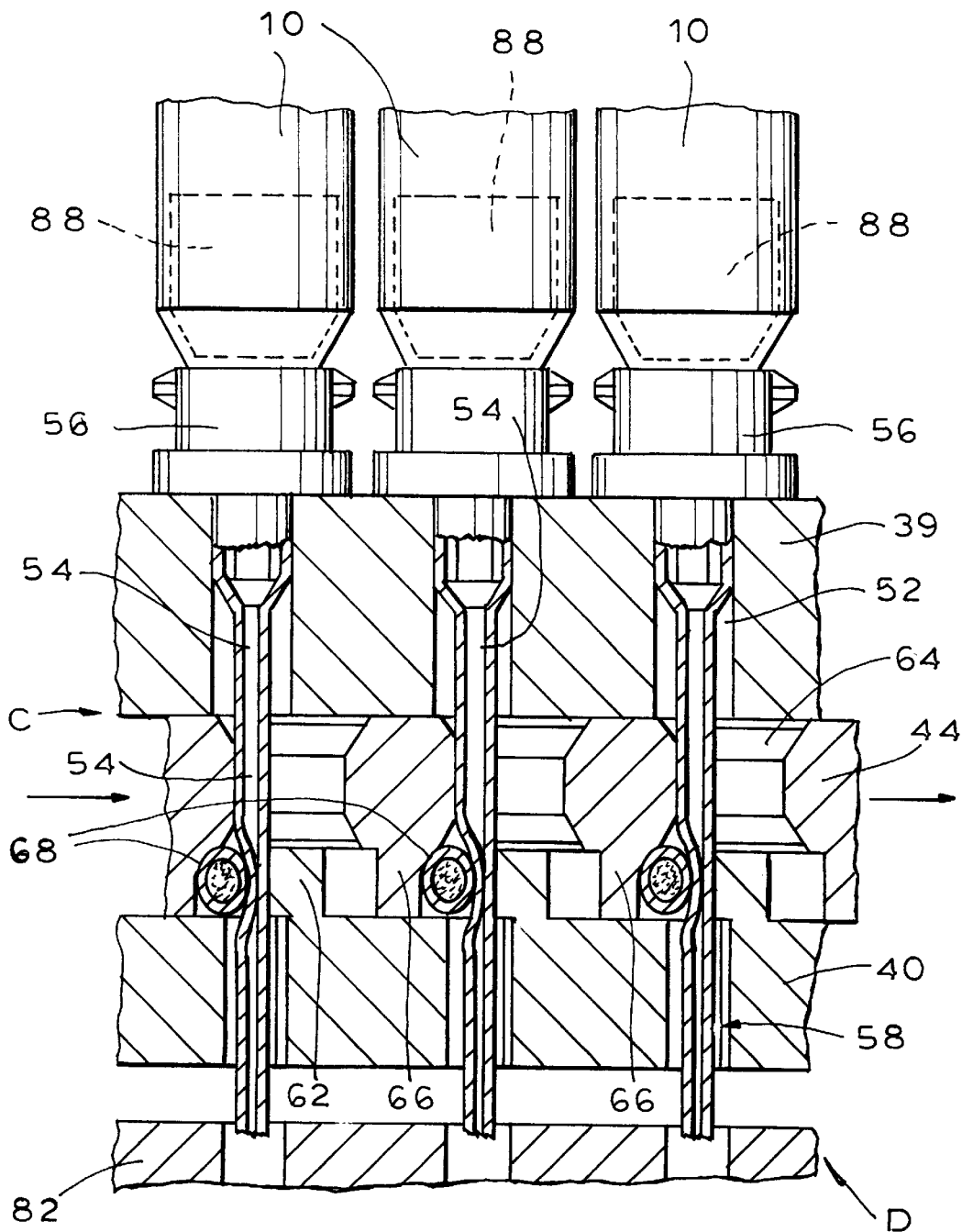
FIG. 8 is an enlarged cross-sectional view taken along line 8—8 of FIG. 7.

However, as is best seen in FIGS. 6 and 8, the surface of rib 66 does not act directly on the walls of the outlet tubes 54. Instead, it acts through a resilient member 68. Member 68 is formed of a sections of Teflon encapsulated silicone O-ring cord commercially available from Lutz Sales Co., Inc. of 4675 Turnbury Dr., Hanover Park, Ill. 60103. Member 68 deforms as ribs 66 and 62 are moved toward each other and pinches tubes 54 as seen in FIGS. 7 and 8 in a manner which does not crush or permanently deform the wall of the tube. Thus, the tube reliably returns to its original shape when the slide returns to its original position, as seen in FIGS. 5 and 6.

As best seen in FIG. 9, which is an enlarged exploded cross-section of a portion of the valve block, the surface of each rib 66 adjacent the resilient member is arcuate to accomodate the curved surface of the resilient member. This curved rib surface insures the proper positioning the resilient member relative to the outlet tubes.

Each end of bottom plate 40 is provided with a plurality of holes 71 each of which is aligned with the space between a different set of ribs 62, 66. Holes 71 extend to the exterior surface of the plate and have a diameter slightly larger than that of the resilient members 68. Holes 71 permit resilient members 68 to be inserted between the ribs 62, 66 after the valve block has been assembled. Holes 71 may be capped or stopped after the resilient members are inserted.

Movement of slide 44 relative to plates 40 and 44 is achieved through the use of end cap 42. End cap 42 has openings 70 to accommodate screws for securing it to bottom and top plates. It also has a central opening 72 through which a threaded screw 74 with a knob 76 extends. The inner diameter of opening 72 is larger then the outer diameter of screw 74 such that screw 74 can rotate freely within opening 72. Screw 76 engages an internally threaded opening 78 in slide 44 such that rotation of screw 76 in a clockwise direction causes slide 44 to move relative to bottom plate 40 such that ribs 66 move towards ribs 62 to close the rows of outlet tubes simultaneously. Rotating screw 76 in the counter-clockwise direction moves the slide to the extreme open posiiton, as shown in FIGS. 5 and 6 such that discharge of fluids through outlet tubes 54 is unimpeded. Overtightening of the plates and crushing or deformation of the tubes is prevented by this structure while complete closure of all tubes is insured when the valve is closed.

Situated under valve block C is collection block D. As seen in FIG. 2, block D consists of a locator plate 77 with a large, generally rectangular central opening 80. Situated below locator plate 77 is a vacuum adapter 79. Adapter 79 has a central recess 81 adapted to receive a collection plate, preferrably in the form of a 96 well densely packed microtiter plate 82 of standard dimension and configuration. For reasons explained below, locator plate 77 functions to shift the position of microtiter plate 82 relative to reactor block A. One simple way to accomplish this is to provide plate 77 in two forms, such that the vacuum adapter is shifted in position, in one form of the locator plate relative to the other. In this way, the position of microtiter plate 82 is shifted relative to the reactor vessels simply by substituting one form of locator plate 77 for the other.

Liquid is drawn downward through the valve block into the microtiter plate using vacuum adapter 79 which is commercially available from Polyfiltronics, Inc. of 100 Weymouth Street, Rockland Me. 02370 which is sold under part number VAC-003. The Polyfiltronics vacuum adapter is modified by adding two upstanding locator pins 83 which fit into location holes 84 in locator plate 77. Two different locator plates 77 are used alternately to align the reactor properly over the microtiter plate for product collection.

Collection block D is situated immediately below valve block C. The vertical position of collection block D relative to valve block C can be altered such that different height collection vessels can be utilized in wells 12 of the microtiter plate simply by addition of the appropriate size spacers (not shown).

Although microtiter plate 82 is capable of receiving 96 collection vessels in its densely packed well array, reactors designed to accept microcannisters cannot be positioned densely enough to align with all 96 wells. Hence, two reactors, of slightly different configuration, are normally necessary if all 96 wells in the microtiter plate are to be used. However, having different reactor configurations greatly complicates the situation and increases the cost.

We overcome this problem by using a single reactor in which 52 possible reactor vessel positions are provided. Thus, two different sets, of 48 vessel positions each, can be selected. By changing the position of the microtiter plate relative to the reactor block, after selecting the second set of 48 vessel positions for use, discharge into all of the wells in the microtiter plate can achieved without using two different reactor configurations. This is illustrated schematically in FIGS. 11 and 12.

Figure 11:
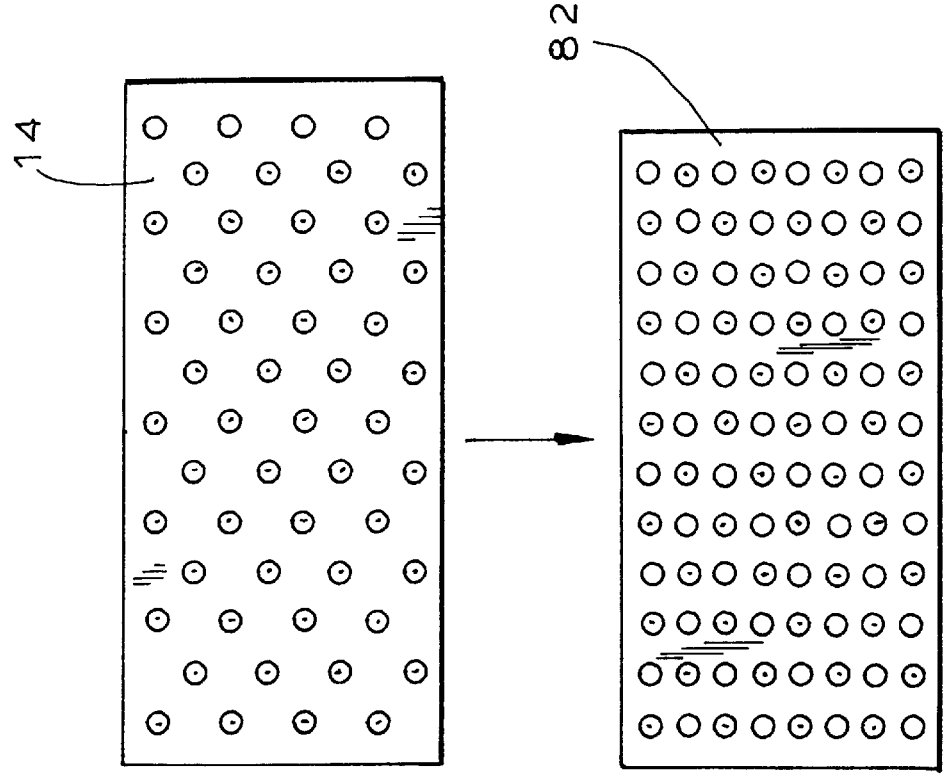
FIG. 11 is a schematic representation of a first set the selected reactor vessel wells and the set of collection wells with which they align.

These figures show pressure plate 14 of reactor block A and microtiter plate 82 of collection block D. The reactor block A has 52 possible reactor vessel positions, thirteen columns of four positions each. In FIG. 11, reactor vessels are shown in all but the right most column. Microtiter plate 82 is shown as positioned toward the left of the drawings, such that reactors in the 48 occupied positions will discharge into the 48 collection vessels located in the wells in the microtiter plate designated with a dot.

Figure 12:
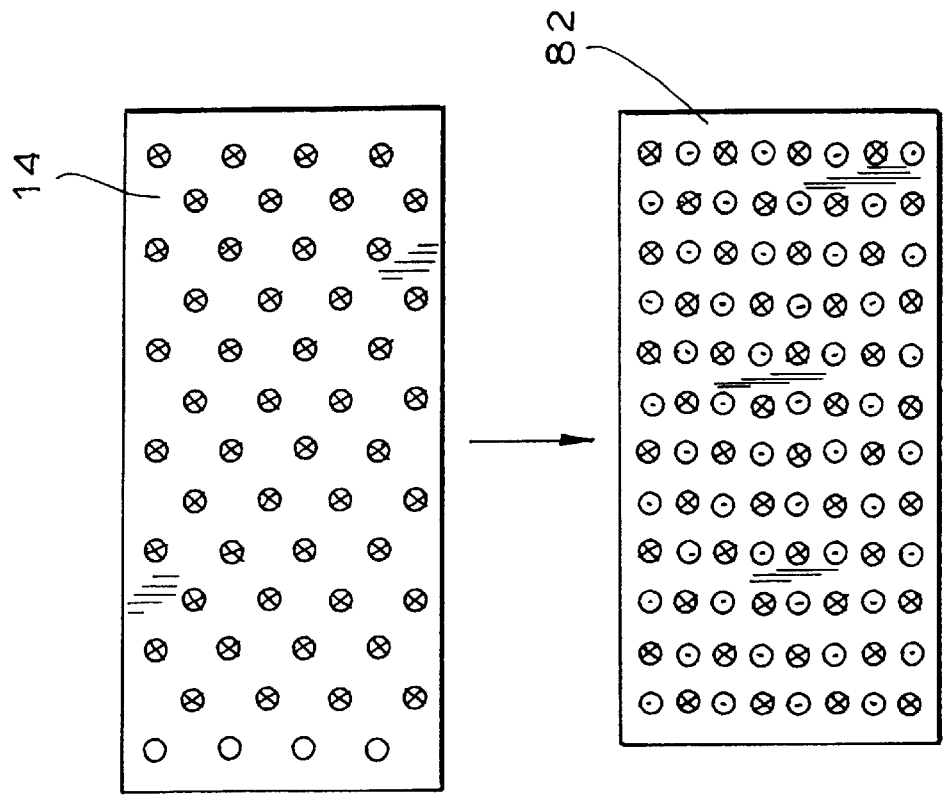
FIG. 12 is a schematic representation of the second set of the selected reactor vessel wells and the other set of collection wells with which they align.

Referring now to FIG. 12, during the next synthesis set, all of the positions in the reactor block are selected except the left most column. By utilizing a slightly different locator plate 77, the microtiter plate is shifted to the right, relative to the reactor vessels. Vessels located in the positions marked by an "X" discharge into the unused 48 collection vessels in the microtiter plate. In this way, the same apparatus, used a second time after shifting the relative position of the microtiter plate, can be used to discharge into all 96 wells of a densely packed microtiter plate.

Figure 13:
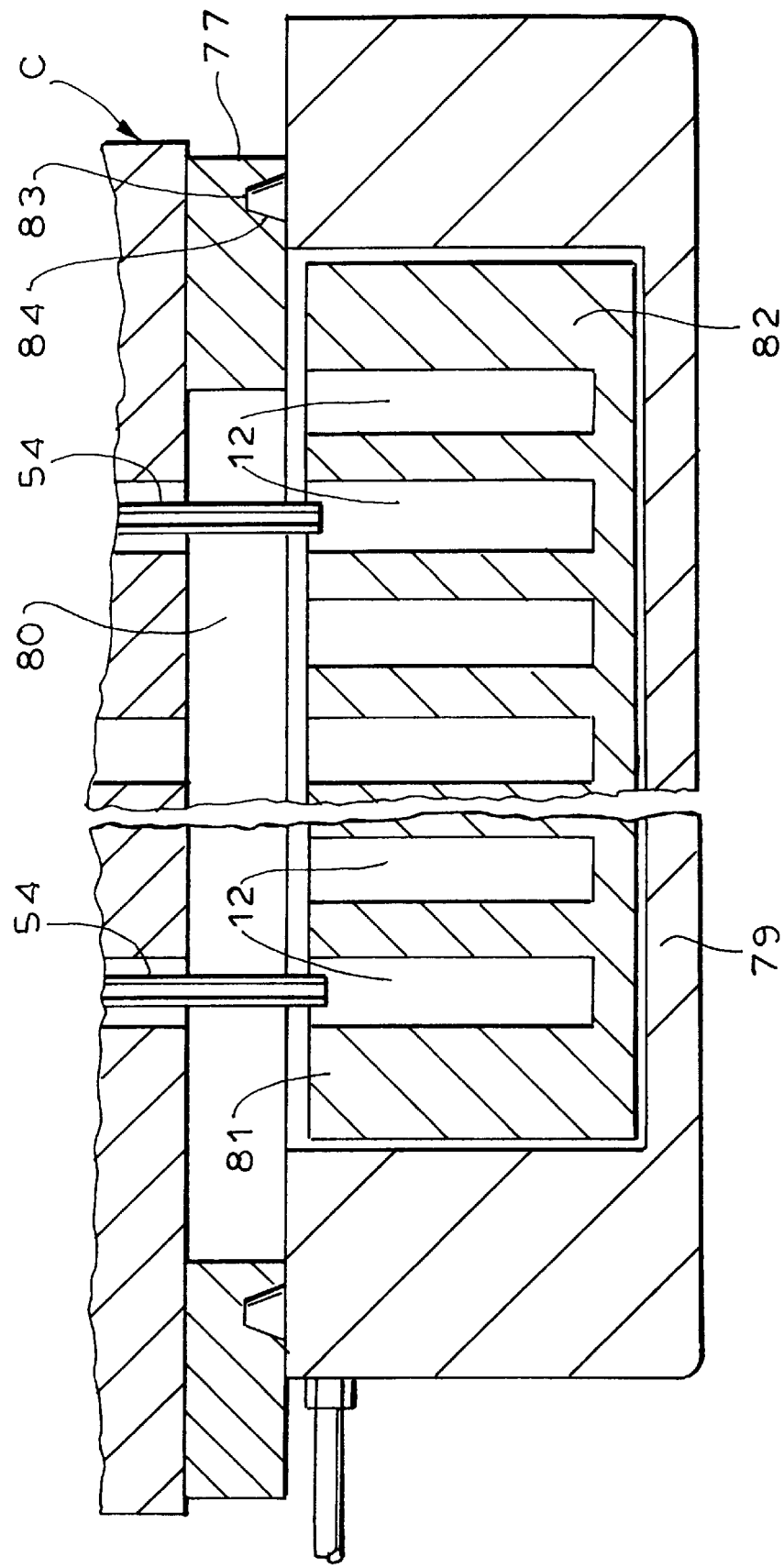
FIG. 13 is a side cross-sectional view of the collection plate and vacuum adapter in the first relative position.

FIGS. 13 and 14 illustrate the structure of the two forms of locator plate 77. With the locator plate shown in FIG. 13, the recess 81 in vacuum adapter 79 containing microtiter plate 82 is shifted in position as compared to recess 81 in the adapter shown in FIG. 14. Thus, by selecting the appropriate locator plate form, the microtiter plate will be aligned with either one or the other set of 48 reactor vessels.

As illustrated in FIG. 8, each reactor vessel 10 is designed so as to receive a commercially available porus polyethelyene microcannister 88 with a radio frequency transmitter tag. These microcannisters are sold by Irori Quantum Microchemistry of of 11025 North Torrey Pines Road, LaJolla, Calif. 92037 and contain the solid phase support. They are porus so as to permit solutions to pass through. They are tagged through the use of a microchip with a semiconductor memory which can store an identification code and other information relating to the construction of the compound in the cannister. The tags can be interrogated to obtain the stored information.

The technique for encoding and tracking combinatorial chemical libraries with this type of microcannister is disclosed in a article entitled "Radiofrequency Encoded Combinatorial Chemistry" by K. C. Nicolaou, Xiao-Yi Xiao, Zahra Parandoosh, Andrew Senyei and Michael P. Nova, published in Angew. Chem. Int. Ed. Engl, 1995, Vol. 34 No. 20 at pages 2289–2291; and an article entitled "Radio Frequency Tag Encoded Combinatorial Library Method for the Discovery of Tripeptide-Substituted Cinnamic Acid Inhibitors of the Protein Tyrosine Phosphatase PTP1B" by Edmund Moran, Sepehr Sarshar, John G. Cargill, Manouchehr M. Shahbaz, Anna Lio, Adnan M. M. Mjalli and Robert Armstrong in J. Am. Chem. Soc. 1995, Vol. 117, No. 43 10787–10788.

One of the advantages of the present invention is that reactor vessels large enough to receive commercially available microcannisters with radio frequency transmitter tags for tracking of the reactors can be employed and a single reactor can be used to deposit directly into all of the 96 wells of a standard microtiter plate. This greatly reduces the complexity and cost of the system while still permitting automated tracking.

It should also be noted that although the apparatus of the present invention is primarily designed for solid and solution phase combinatorial synthesis, the reaction vessels could be filled with a sorbent and the products could be purified by passing them through the sorbent, a process known as "solid phase extraction". It is believed that the present design results in a better solid phase extraction apparatus than anything currently available.

It will now be appreciated that the apparatus of the present invention consists of a modular reactor which is simple in design, small in size, light in weight and inexpensive to build and operate. It includes a simplied yet extremely reliable valve means for simultaneously regulating the discharge from the reactor vessels without crushing or deforming the reactor vessel outlet tubes. The reactor vessels are suitable for receiving porus polyethelene microcannisters with radio frequency transmitter tags for use in automated encoding. By providing 52 reactor vessel positions in the reactor block and a collector block which can shift a standard 96 microtiter plate between two different relative positions, a single reactor can be used to discharge into all 96 wells of the microtiter plate. Multilevel alignment standoffs facilitate mounting and alignment of selected components to obtain the desired configuration. Moreover, the apparatus of the present invention can be used to perform the entire synthesis or only to perform the cleavage step in a radio frequency tagged synthesis.

While only a limited number of preferred embodiments of the present invention have been disclosed for purposes of illustration, it is obvious that many variations and modifications thereof are possible. It is intended to cover all of these variations and modifications, which fall within the scope of the present invention, as recited by the following claims:

We claim:

1. Apparatus useful for the synthesis of multiple organic compounds, having means to receive an array of individual reactor vessels, each vessel having a port connected to an outlet tube, valve means for the simultaneous regulation of discharge through said outlet tubes, said valve means comprising first and second aligned, relatively moveable surfaces between which said outlet tubes extend and resilient means interposed between one of said surfaces and said outlet tubes, such that relative movement of said surfaces causes force to be applied through said resilient means to close said outlet tubes.

2. The apparatus of claim 1 wherein said surfaces comprise plates.

3. The apparatus of claim 1 wherein said surfaces comprise ribs on plates.

4. The apparatus of claim 1 wherein said resilient means comprises an encapsulated silicone O-ring cord.

5. The apparatus of claim 1 wherein one of said surfaces is shaped to correspond to the exterior shape of said resilient means.

6. The apparatus of claim 1 wherein one of said surfaces has an arcuate shape.

7. The apparatus of claim 1 wherein said valve means is located below the reactor vessels.

8. The apparatus of claim 3 wherein one of said plates comprises an opening through which said resilient means can be inserted between said ribs.

9. The apparatus of claim 1 further comprising collection means, said collection means comprising an array of collection wells.

10. The apparatus of claim 9 wherein said collection means has 2X number of collection wells and said apparatus comprises means to receive X number of reactor vessels in Y number of possible positions, where Y is a number larger than X.

11. The apparatus of claim 1 wherein said reactor vessels comprise porus polyethylene microcannisters with radio frequency encodable microchip identifier tags.

12. The apparatus of claim 1 further comprising multilevel component alignment means.

13. Valve means for the simultaneous regulation of discharge through outlet tubes connected to the ports of reactor vessels received in apparatus for the manipulation of multiple organic compounds, the valve means comprising first and second aligned, relatively moveable surfaces between which the outlet tubes extend and resilient means interposed between one of said surfaces and the outlet tubes, such that relative movement of said surfaces causes force to be applied through said resilient means to close the outlet tubes.

14. The means of claim 13 wherein said surfaces comprise plates.

15. The means of claim 13 wherein said surfaces comprises ribs on plates.

16. The means of claim 13 wherein said resilient means comprises Teflon encapsulated silicone O-ring cord.

17. The means of claim 13 wherein one of said surfaces is shaped to correspond to the exterior shape of said resilient means.

18. The means of claim 13 wherein one of said surfaces has an arcuate shape.

* * * * *